(12) United States Patent
Takeno

(10) Patent No.: US 6,374,950 B1
(45) Date of Patent: Apr. 23, 2002

(54) LUBRICATION AND TEMPERATURE CONTROL METHODS FOR A JOURNAL BEARING SYSTEM

(75) Inventor: Nakakatsu Takeno, 3722-6 Yontanchi, Okuda-cho, Inazawa Aichi (JP)

(73) Assignees: Nakakatsu Takeno, Aichi; Mitsui Seiko Kogyo Co., Ltd., Tokyo, both of (JP)

( * ) Notice: Subject to any disclaimer, the term of this patent is extended or adjusted under 35 U.S.C. 154(b) by 0 days.

(21) Appl. No.: 09/498,583

(22) Filed: Feb. 4, 2000

(51) Int. Cl.$^7$ ............................................. F16N 27/00
(52) U.S. Cl. ...................... 184/7.4; 384/399; 384/400
(58) Field of Search ................... 184/7.4, 6.22; 384/388, 392, 399, 400

(56) References Cited

U.S. PATENT DOCUMENTS

| | | | | |
|---|---|---|---|---|
| 5,180,034 A | * | 1/1993 | Lopes ........................ | 184/6.1 |
| 5,186,277 A | * | 2/1993 | Snuttjer et al. ............ | 184/6.22 |
| 5,626,470 A | * | 5/1997 | Gerhardt ...................... | 418/84 |
| 5,733,048 A | * | 3/1998 | Ei-Ibiary et al. ............ | 384/399 |
| 5,769,545 A | * | 6/1998 | Bently et al. ............... | 384/118 |

* cited by examiner

*Primary Examiner*—David Fenstermacher
(74) *Attorney, Agent, or Firm*—Beyer Weaver & Thomas, LLP

(57) ABSTRACT

A lubricant is supplied to a bearing for a rotary shaft by an oil pump capable of discharging the lubricant at different flow rates depending upon its speed of operation. The oil pump is preliminarily operated to allow the user to derive and determine a relationship between temperature rise in the bearing and the flow rate of the lubricant by the oil pump with rate of rotation of the shaft as parameter. An optimum flow rate at which the temperature rise is minimized can be determined from such a relationship. The oil pump is operated such that the lubricant is discharged at this optimum flow rate and according to the current rotary speed of the shaft. Corresponding to different rotary speeds of the shaft, a temperature characteristic curve representing these optimum flow rates of the lubricant can be obtained, and this temperature characteristic curve may be used to vary the speed of operation of the oil pump to change the flow rate of the lubricant according to different rotary speeds of the shaft. When it is desired to increase the temperature of the bearing faster such that it can reach its saturation point more quickly, the oil pump can be operated such that the flow rate of the lubricant will be much greater than the optimum rate determined as described above and then reduced after the saturation point is reached.

4 Claims, 6 Drawing Sheets

LUBRICATION AND TEMPERATURE CONTROL METHODS FOR A JOURNAL BEARING SYSTEM

BACKGROUND OF THE INVENTION

This invention relates to a method of lubricating a journal bearing system of an industrial machine, or a high-precision machine tool such as a grinding machine, a lathe and a machining center. This invention also relates to a method of temperature control by using such a lubrication method.

As the speed of rotation of a main shaft of a machine tool increases, the temperature of its bearing rises accordingly faster and such a rise in temperature often dictates the maximum operating speed of the shaft. Since the main shaft and its support may undergo a thermal deformation which may adversely affect the work precision, it has been an important problem how to limit the rise in the temperature of the bearing. FIG. 1 shows a prior art device for supplying a lubricant to a bearing wherein a spindle unit 1 is shown as comprising a main spindle 2 having a tool attached to its tip, being rotatably supported by a bearing (such as a hydrodynamic bearing or a ball bearing), and being driven through a belt or by being directly connected to a motor 3. An oil pump 5 for the lubricant supplying device is connected to an oil tank 7 through a filter 6 and is adapted to discharge oil at a fixed rate by the operation of a pump-driving motor 8. The discharged lubricant oil is supplied to the spindle unit 1 through a flow rate adjusting valve 9, a pressure control valve 10 and a supply flow route 11. After lubricating the bearing, the oil is then returned to the oil tank 7 through a discharge flow route 12. The flow rate adjusting valve 9 is usually set appropriately in view of the flow required by the bearing. The portion of the oil not supplied to the bearing is returned to the oil tank 7 through a discharge route 13 of the pressure control valve 10.

The oil pump 5 and the pump-driving motor 8 are designed to have a larger-than-necessary operating capacity. Thus, the portion of the oil not necessary for lubrication is discharged through the discharge route 13 of the pressure control valve 10 and thereby raises the temperature of the oil inside the tank 7. This means that the oil pump 5 and the pump-driving motor 8 are wasting energy to the extent represented by the discharged amount of the oil. This wasted energy ends up as a rise in the temperature of the lubricant supplying device as a whole and also that of the lubricant oil in addition to the regular rise in the temperature of the oil due to the generation of heat accompanied by the rotary motion of the main shaft inside the bearing unit. In other words, the overall temperature of the bearing unit approaches more quickly the maximum allowable level for the operation of the unit, while the thermal deformation of the machine is increased.

Although an attempt may be made to adjust the flow rate of the lubricant oil by means of a flow rate control valve, the flow rate is not optimized in most situations and the adjustment is usually made on the larger side. This results in a random flow pattern inside the bearing unit and tends to raise the temperature.

SUMMARY OF THE INVENTION

It is therefore an object of this invention in view of the above to provide an improved method of lubricating a bearing of a rotary shaft, instead of the prior art mechanism for supplying a bearing unit a lubricant which has been heated additionally due to the stirring inside the bearing unit and the extra energy generated by the lubricant supplying device itself.

It is another object of this invention to provide a method of controlling the temperature of a rotary shaft by using such an improved method of lubrication.

According to this invention, use is made of an oil pump adapted to supply a lubricant to the bearing at different flow rates depending upon how fast the oil pump is operated, say, by means of a motor. The oil pump is preliminarily operated such that the user can derive, or determine, a relationship between temperature rise in the bearing and the flow rate of the lubricant by the oil pump with the spindle speed as a parameter. If this relationship is drawn as a curve in a graph, the graph shows a minimum point, indicating that there exists an optimum flow rate at which the temperature rise of the bearing can be minimized. After such a relationship is established, the oil pump is operated such that the lubricant is discharged at the optimum flow rate thus determined according to the current rotary speed of the shaft.

From such curves corresponding to different rotary speeds of the shaft, a temperature characteristic curve representing these optimum flow rates of the lubricant can be obtained corresponding to different rotary speeds of the shaft, and this temperature characteristic curve may be used to vary the speed of operation of the oil pump to change the flow rate of the lubricant according to different rotary speeds of the shaft.

When it is desired to increase the temperature of the bearing faster such that it can reach its saturation point more quickly, the oil pump can be operated at a faster rate such that the flow rate of the lubricant will be much greater than the optimum rate determined as described above and then reduced after the saturation point is reached.

BRIEF DESCRIPTION OF THE DRAWINGS

The accompanying drawings, which are incorporated in and form a part of this specification, illustrate embodiments of the invention and, together with the description, serve to explain the principles of the invention. In the drawings.

Throughout herein, equivalent components are indicated by the same numerals even where they are components of different devices and may not necessarily be explained repetitiously.

DETAILED DESCRIPTION OF THE INVENTION

The invention is based on discoveries made by the inventor herein as a result of his many years' research on the relationship between the rise in the temperature of a hydrodynamic bearing for a main shaft unit and the flow rate of a lubricant. Although it was commonly believed that the rise in the temperature of a bearing can be controlled by increasing the flow rate of a lubricant, the present inventor discovered after many experiments that this is not always the case. Since every rotary shaft is designed according to many conditions such as the structure of its bearings and the nature of the load, it has an optimum flow rate at which a lubricant should be supplied to it. It was indeed discovered that each rotary shaft has its own optimum flow rate for its lubricant at which the rise in the temperature of the bearing can be minimized.

Figure 2:
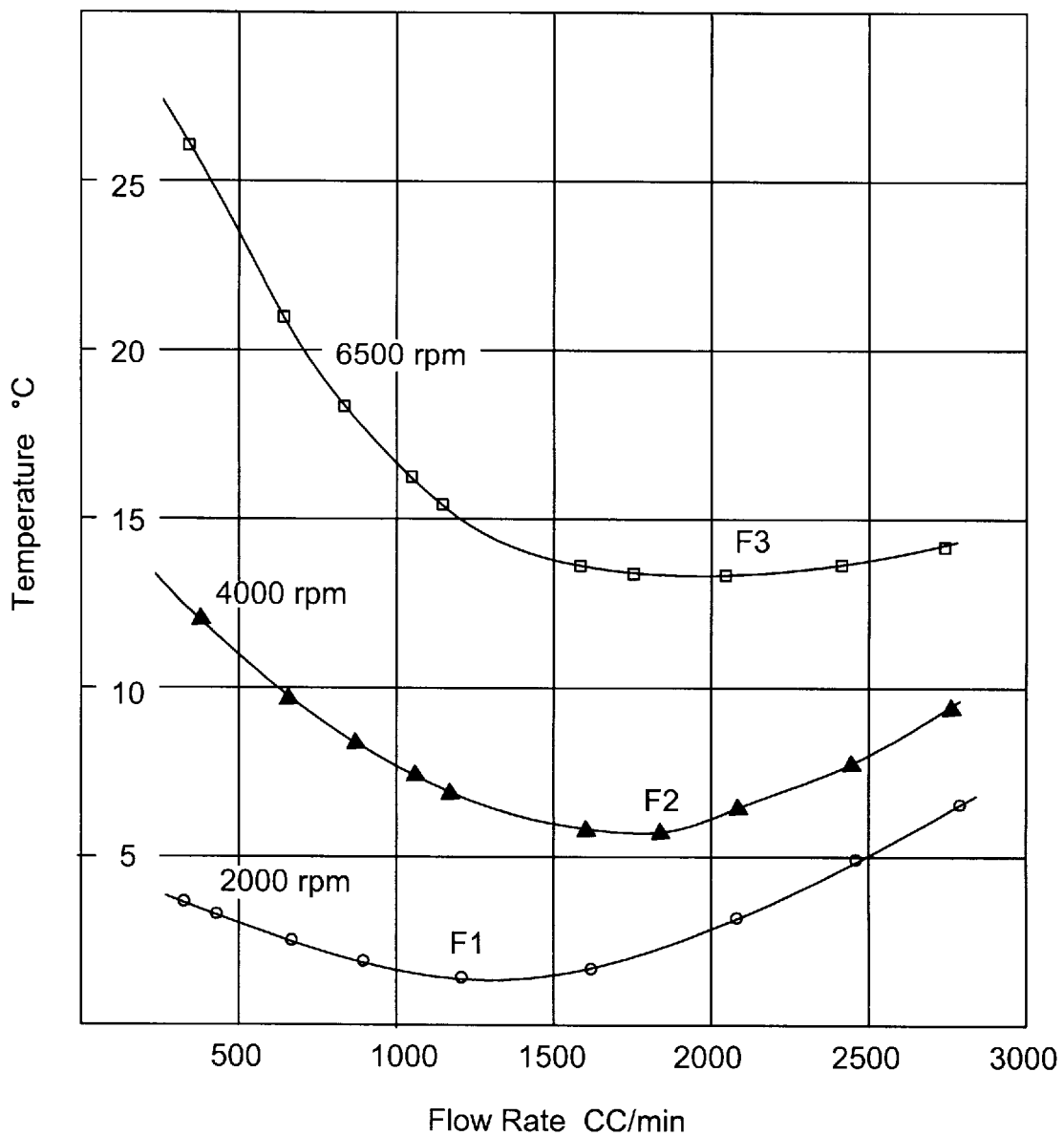
FIG. 2 is a graph showing experimentally obtained relationship between the temperature rise in the bearing and the lubricant flow rate.

One of the inventor's discoveries was that the return back to the tank of the excess lubricant not needed for the lubrication of the bearing had a significantly adverse effect in raising the temperature of the lubricant. Another discovery was that the prior art attempt to use a flow rate adjusting valve in order to control the amount of the lubricant required by the bearing unit was not yielding an appropriate result. The flow rate used to be adjusted to be on the larger side, causing a random flow inside the bearing unit due to the stirring of the excess lubricant and thereby raising the temperature additionally. FIG. 2 shows the relationship between the temperature rise and the flow rate of the lubricant, using the rotary speed of the shaft as parameter. These experiments were carried out at room temperature (25° C.) by means of a hydrodynamic bearing with shaft diameter of 55 mm, using Esso Standard (velocity 3) as the lubricant. When the rotary speed of the shaft was 2000 rpm, FIG. 2 shows that the temperature rise decreased gradually as the flow rate of the lubricant was increased up to the value of about 1200 cc/minute (indicated by symbol F1) but the temperature rise increased beyond this point. This is due to the phenomenon of random flow caused by the stirring of the excess lubricant inside the bearing unit. The minimum point (F2) in the case of rotary speed 400 rpm was near 1800 cc/minute and that (F3) in the case of rotary speed 6500 rpm was near 2300 cc/minute. It goes without saying that the exact positions of these minimum points will change, depending on factors such as the structure of the bearing and the load. What is important is that these characteristic curves have a minimum point. Thus, such a curve should be obtained preliminarily for each bearing unit.

Figure 1:
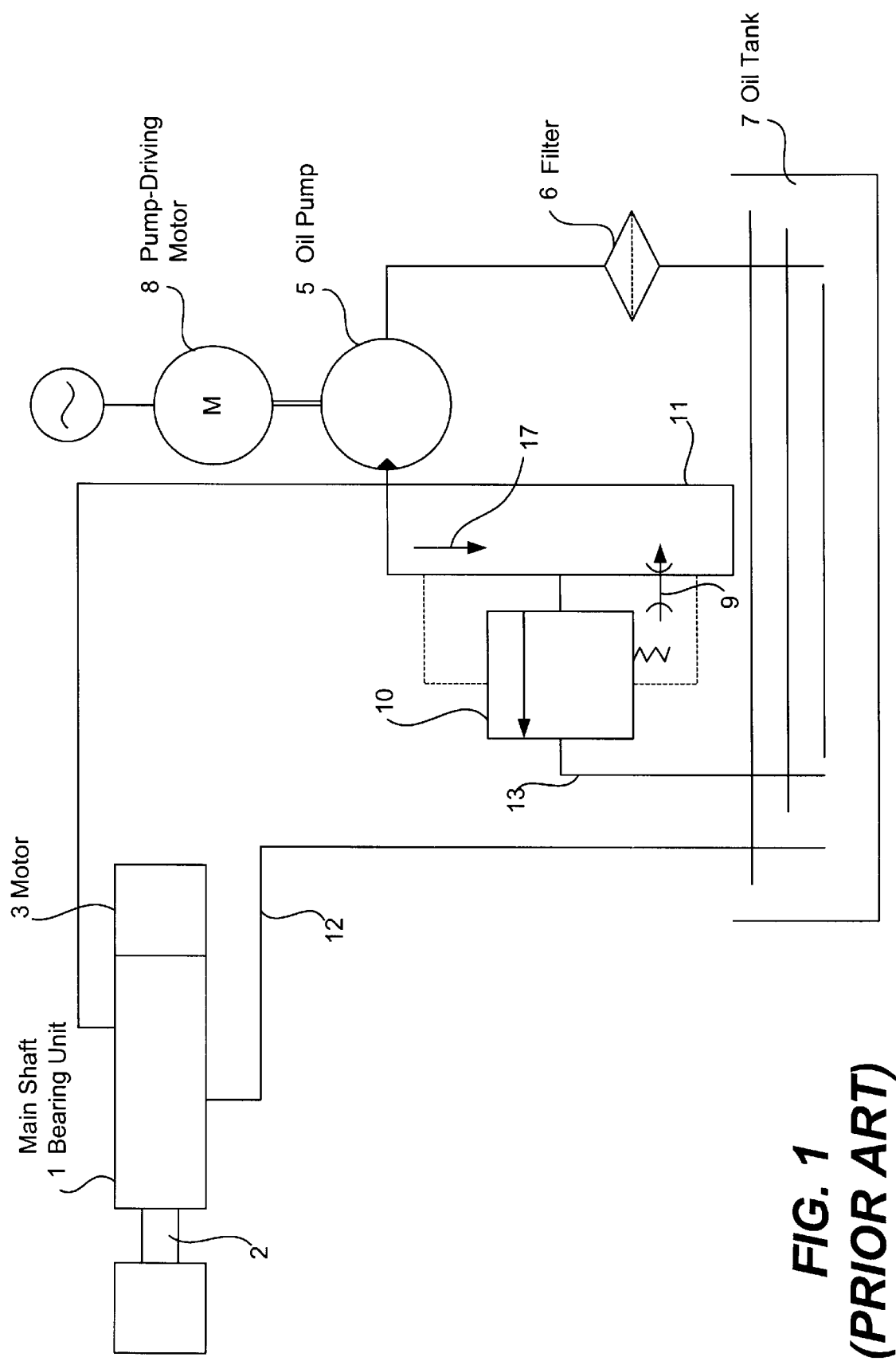
FIG. 1 is a schematic structural diagram of a prior art lubricating device for a bearing.

A lubricating device embodying this invention, designed on the basis of the result of the experiments discussed above, is described next with reference to FIG. 3 in which components which are substantially the same as those in FIG. 1 are indicated by the same numeral and will not be described repetitiously. The oil pump 5 is one of a commercially available kind, adapted to vary the rate of discharge by varying its speed of operation. The pump-driving motor 8 therefor is controlled by a control unit 20. It is to be noted that the flow rate adjusting valve 9 and the pressure control valve 10 which were necessary in the prior art device of FIG. 1 are herein dispensed with.

Figure 3:
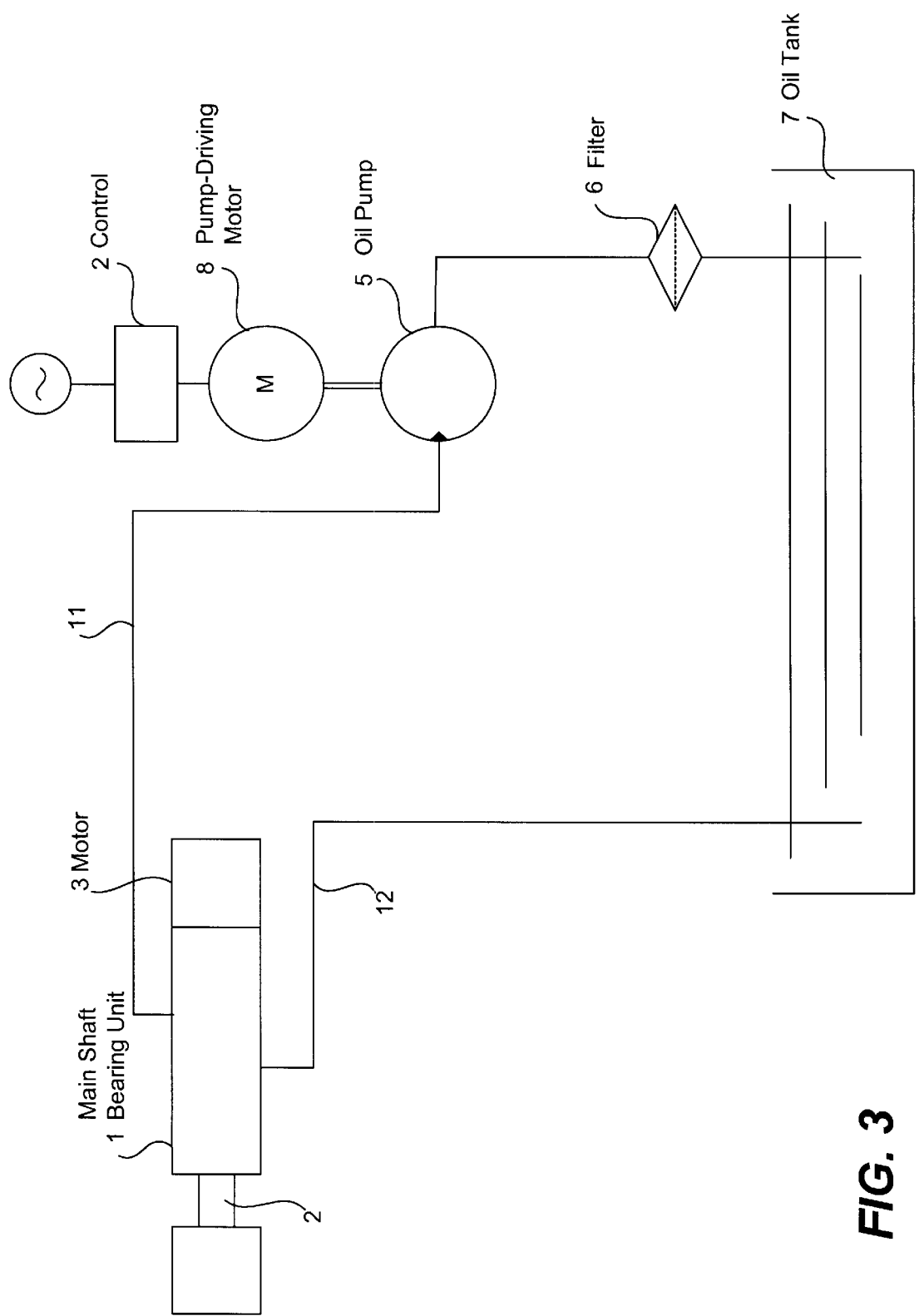
FIG. 3 is a schematic structural diagram of a lubricant device embodying this invention for a bearing.
Figure 4:
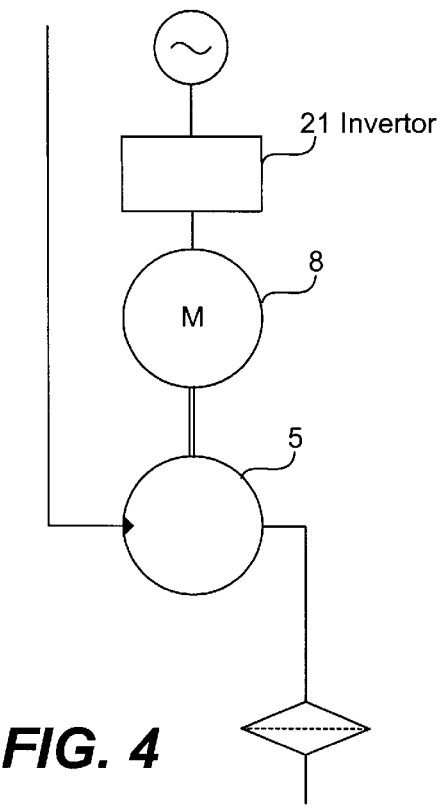
FIG. 4 is a block diagram of a portion of the device of FIG. 3 including its control unit and the pump-driving motor according to one example.
Figure 5:
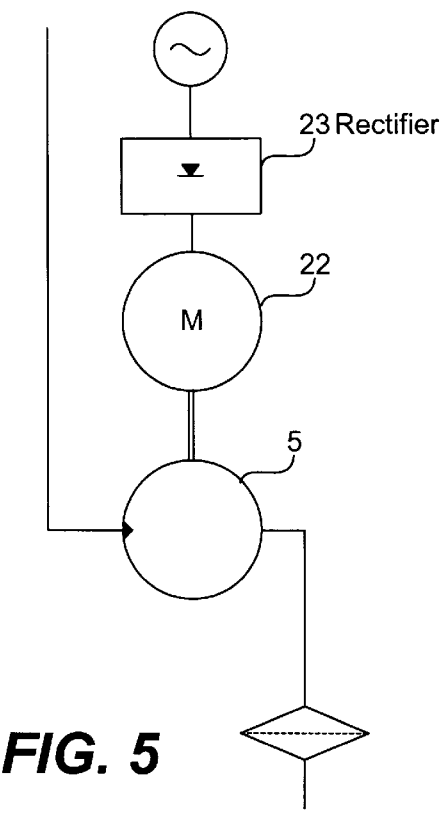
FIG. 5 is a block diagram of a portion of the device of FIG. 3 including its control unit and the pump-driving motor according to another example.

FIG. 4 shows an example wherein a commercially available ordinary invertor 21 is serving as the control unit 20 of FIG. 3 for a ordinary general-purpose motor 8. The invertor 21 serves in this case to control the motor 8 so as to obtain a desired discharge rate from the oil pump 5. FIG. 5 shows another example wherein the motor 8 of FIG. 3 is a DC motor 22 and power is supplied thereto from an AC power source through a transformer and rectifier 23. Thus, the DC voltage is varied such that the speed of operation of the oil pump 5 is adjusted so as to obtain a necessary discharge rate.

Figure 6:
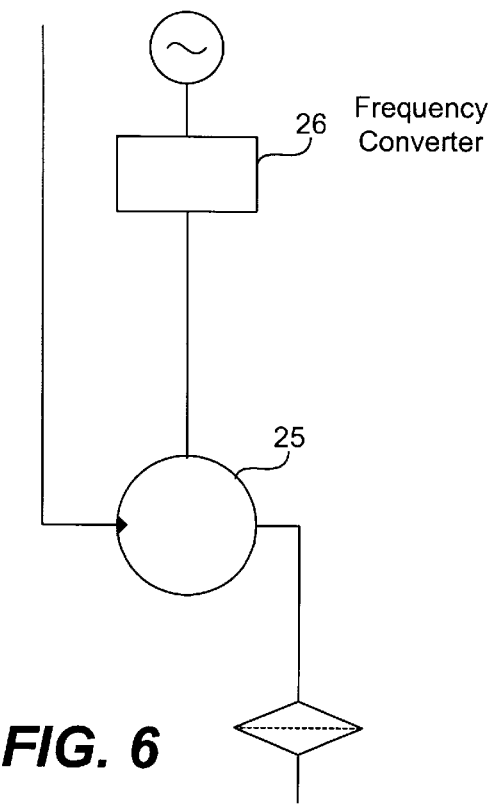
FIG. 6 is a block diagram of a portion of the device of FIG. 3 including its control unit and the pump-driving motor according to still another example.

FIG. 6 shows still another example wherein the oil pump 5 of a commercially available kind shown in FIG. 3 is a linear-motor type pump or a vibrator type pump 25, coupled with a frequency converter 26 for controlling the rotary motion of the pump so as to obtain a desired rate of discharge.

Figure 7:
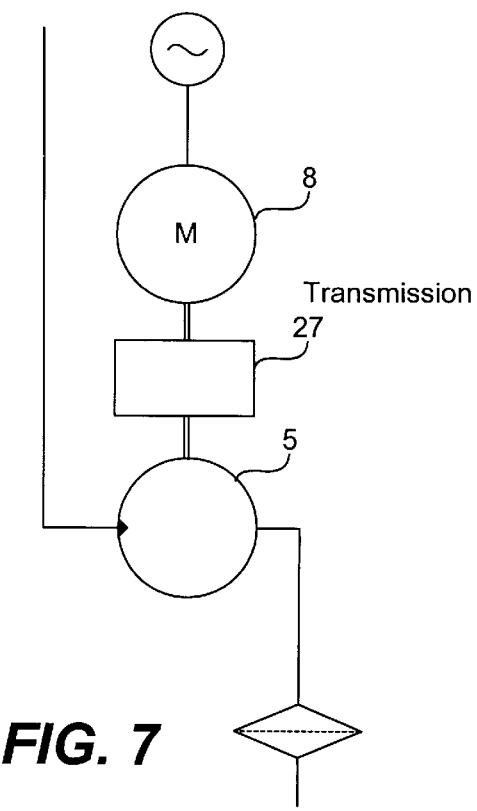
FIG. 7 is a block diagram of a portion of the device of FIG. 3 including its mechanical control unit.

FIG. 7 shows a different example wherein the control is effected mechanically. The output shaft of the motor 8 is connected to a transmission device 27 of a commercially available type, and this output shaft is connected to the oil pump 8. The transmission device 27 thus connected is controlled to obtain a desired discharge rate in this example.

Next the operation of a device thus structured will be described. As soon as it is decided what kind of a spindle unit 1 is to be used according to the conditions of its use, the rate of its rotation is automatically determined although such a rate may be uniquely determined under certain circumstances while it may be variable within a certain range, depending on the purpose of use. Let us assume for the convenience of description that the device is controlled electrically as shown in FIG. 4 by the control unit 21. Now, using the rotary speed of the main shaft as parameter, characteristic curves as shown in FIG. 2 between the temperature rise and the flow rate of the lubricant are preliminarily obtained experimentally and an optimum flow rate value is ascertained from which a graph. From a table showing the relationship between the discharge rate from the oil pump and its rotary speed of operation, the optimum speed of operation corresponding to the optimum discharge rate can be selected. Thus, the frequency is selected by the invertor 21 to control the speed of operation of the motor 8 so as to obtain a desired speed of operation of the oil pump. From the initially determined relationship between the speed of operation of the oil pump and its discharge rate, the speed of operation of its motor can be determined.

Figure 8:
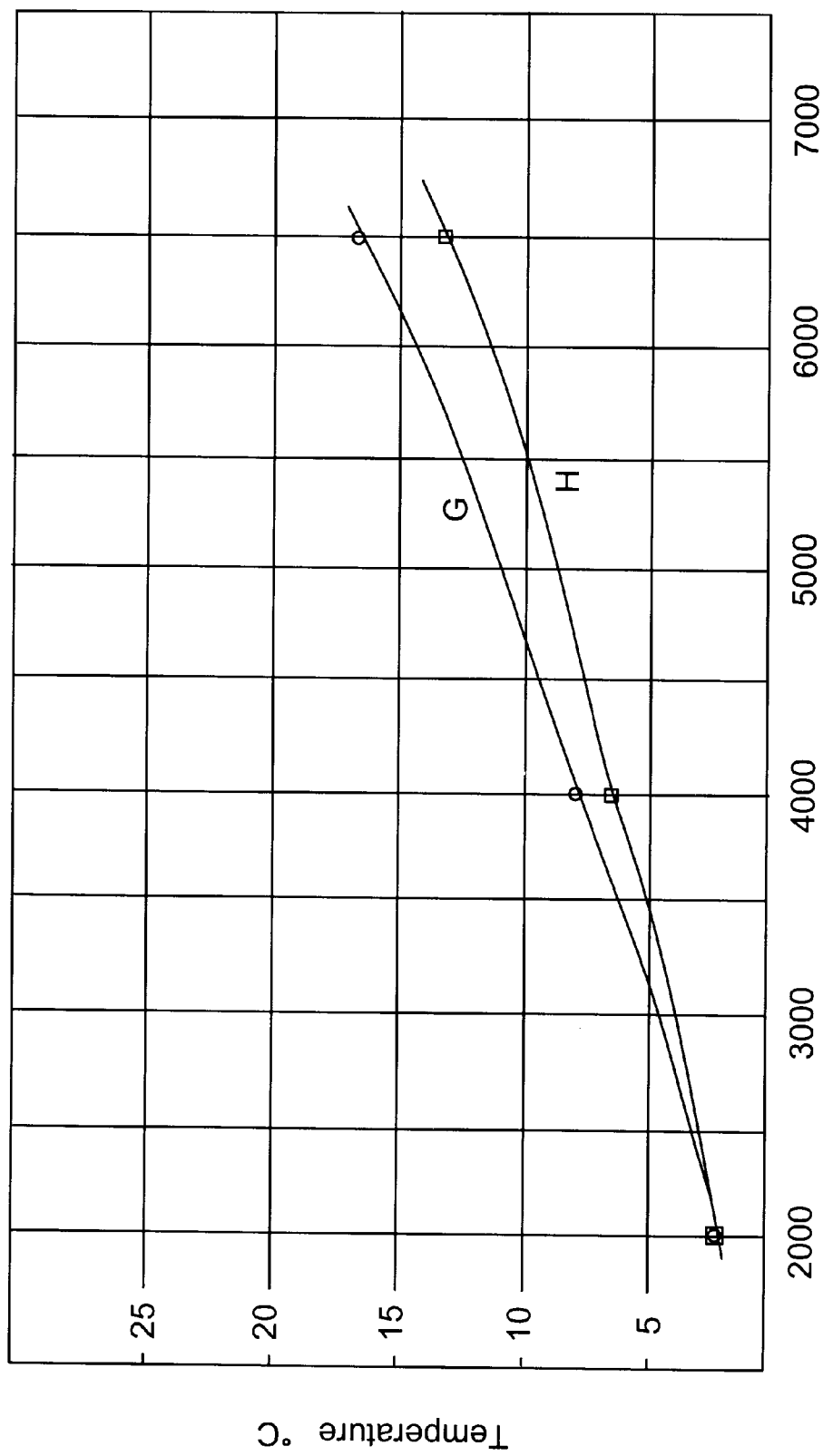
FIG. 8 is a temperature characteristic curve for indicating optimum flow rates for different rotary speed of the shaft.

Explained by way of an example, let us assume that the rotary speed of the shaft was determined to be 4000 rpm. From the graph shown in FIG. 2, this means that the optimum flow rate of the lubricant is 1800 cc/minute. One can also connect the points F1, F2 and F3 of FIG. 2 to obtain a temperature curve H as shown in FIG. 8, each point on which represents the minimum temperature rise at a given rotary speed. Line G in FIG. 8 represents the relationship between the temperature rise and the rotary speed when the flow rate is fixed at the value represented by point F2 shown in FIG. 2, that is, it is obtained by drawing a vertical line passing through point F2 in FIG. 2 and determining at what points along the vertical axis this line crosses the curves corresponding to different rotary speeds. Thus, line G shows higher temperature rises than line H at rotary speeds higher than 2000 rpm. The vertical distance between lines G and H is indicative of the difference in temperature rise attainable by the present invention.

As power is switched on for the lubricating device, the motor 8 starts to rotate at the rotary speed selected by the invertor 21. As a result, the oil pump 5 discharges the lubricant at the selected flow rate of 1800 cc/minute and supplies it through the supply flow route 11 into the spindle unit 1. Since the optimum flow rate for the device has been selected, there is no random flow inside the bearing unit due to stirring, and the lubricant is thereafter returned back through the discharge flow route 12 to the oil tank 7. Since no extra energy has been wasted, there is no extra rise in the lubricant temperature inside the oil tank 7 and the overall rise in the lubricant temperature is kept to a minimum. Although the invention has been described above by way of a hydrodynamic bearing, it goes without saying that similar favorable results obtain also with ball and roller bearings.

Let us consider a situation where a rotary speed of the shaft can be selected from a relatively wide range, or where a very large speed of operation is required for an oil pump capable of discharging at a rate corresponding to the rotary speed of the pump. In such a situation, the user may preliminarily derive a characteristic temperature curve by first obtaining a relationship between the temperature rise and the flow rate of the lubricant with the rotary speed of the shaft as a parameter and connecting the points each representing the lowest temperature rise at the corresponding rotary speed. According to this invention, in summary, the flow rate of the lubricant is varied according to the selected rotary speed of the shaft in order to minimize the temperature rise no matter what rotary speed is selected.

Figure 9:
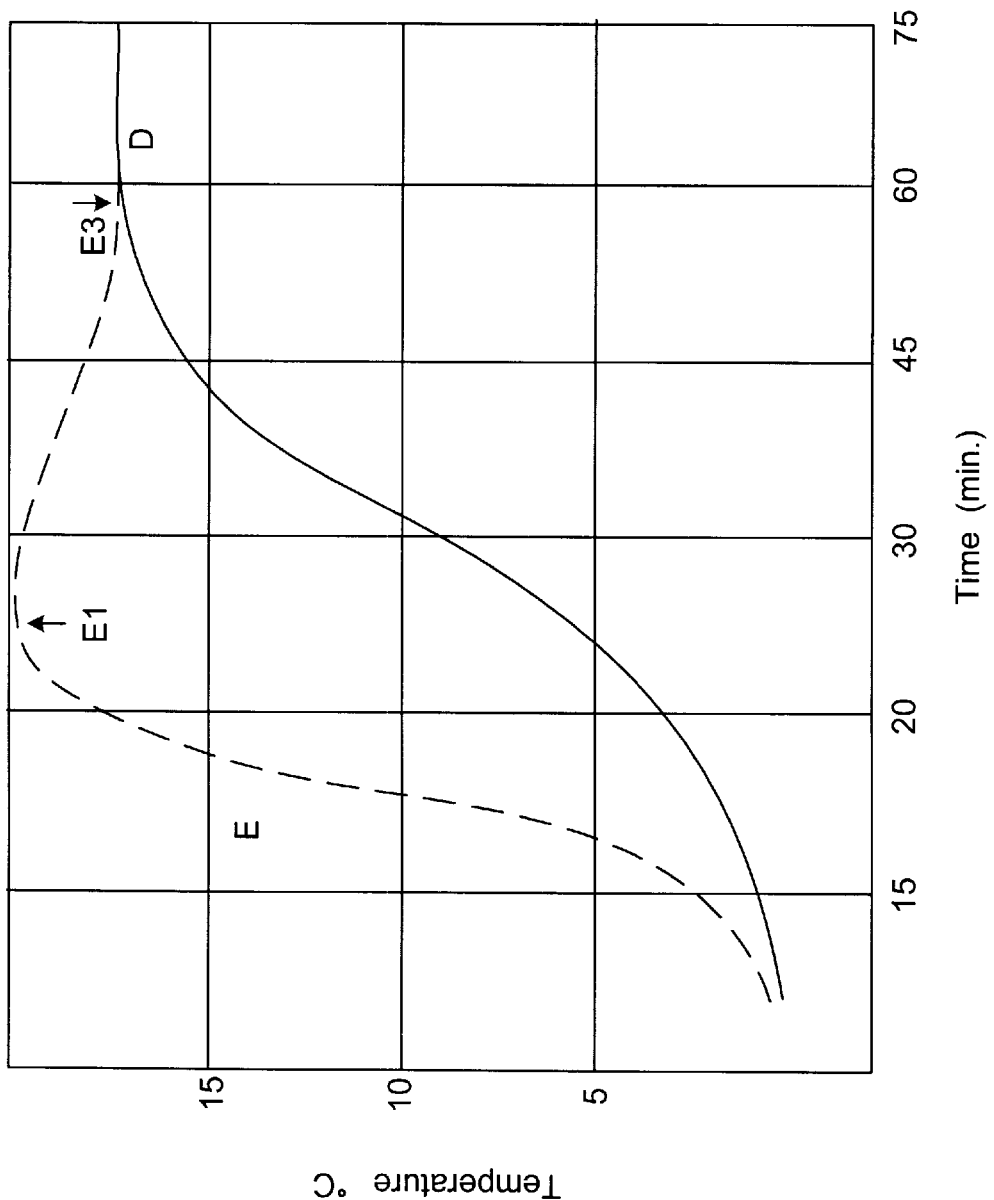
FIG. 9 is a graph showing the relationship between the temperature rise in a bearing with time.

The present invention is also applicable to a situation where the temperature of the bearing unit is desired to reach its stable condition (a saturation point) as quickly as possible after it is started up. If the flow rate of the lubricant is reduced excessively, the initial rise in the temperature can be made sharp and there is the danger of damage to the bearing. If the normal temperature rise due to the rotary motion of the shaft changes with time as shown by curve D in FIG. 9, the lubricant is initially supplied at a much faster rate at each moment than the optimum flow rate determined by the rotary speed of the shaft at that moment such that the temperature will rise more quickly, say, as shown by curve E in FIG. 9. When a specified maximum allowable temperature rise indicated by point E' is reached, the supply rate of the lubricant is reduced so as to eventually reach a value corresponding to the selected rotary speed of the shaft. In this manner, the time required for the temperature to reach the saturation point can be reduced significantly (about 50% according to the example shown in FIG. 9).

In the case of a rotary shaft which undergoes frequent start-ups, the present invention is particularly useful because the flow rate of the lubricant can be controlled as described above so as to be increased initially beyond the optimum rate in order to speed up the temperature rise to the saturation point while an excessive temperature rise is prevented by returning the flow rate of the lubricant to the optimum level. The invention can be practiced in a variety of ways in a variety of situations such as obtaining an optimum lubricant flow rate from FIG. 2 and controlling the operation of the oil pump either manually or automatically. The demonstrated examples are not intended to limit the scope of the invention. Many modifications and variations to these examples, which may be apparent to a person skilled in the art, are intended to be within the scope of the invention.

What is claimed is:

1. A method of lubricating a bearing for a rotary shaft; said method comprising the steps of:

providing an oil pump for supplying a lubricant to said bearing, said oil pump discharging said lubricant at a flow rate depending upon speed of operation of said oil pump;

preliminarily operating said oil pump to determine a relationship between temperature rise in said bearing and flow rate of said lubricant by said oil pump with rate of rotation of said shaft as a parameter and thereby determining optimum flow rates of said lubricant for giving minimum temperature rise in said bearing corresponding to different rotary speeds of said shaft; and thereafter operating said oil pump such that said oil pump discharges said lubricant at an optimum flow rate determined by said relationship and according to rotary speed of said shaft.

2. A method of lubricating a bearing for a rotary shaft; said method comprising the steps of providing an oil pump for supplying a lubricant to said bearing, said oil pump discharging said lubricant at a flow rate depending upon speed of operation of said pump;

preliminarily operating said oil pump to determine a relationship between temperature rise in said bearing and flow rate of said lubricant by said oil pump with rate of rotation of said shaft as a parameter and thereby determining optimum flow rates of said lubricant for giving minimum temperature rise in said bearing corresponding to different rotary speeds of said shaft;

obtaining a temperature characteristic curve representing said optimum flow rates of said lubricant corresponding to different rotary speed of said shaft; and varying operation of said oil pump to change flow rate of said lubricant according to different rotary speed of said shaft by using said temperature characteristic curve.

3. A method of lubricating a bearing for a rotary shaft; said method comprising the steps of:

providing an oil pump for supplying a lubricant to said bearing, said oil pump discharging said lubricant at a flow rate depending upon speed of operation of said pump;

preliminarily operating said oil pump to determine a relationship between temperature rise in said bearing and flow rate of said lubricant by said oil pump with rate of rotation of said shaft as a parameter and thereby determining optimum flow rates of said lubricant for giving minimum temperature rise in said bearing corresponding to different rotary speeds of said shaft;

operating said oil pump at a start-up of said shaft so as to discharge said lubricant at significantly greater flow rates than said optimum flow rates corresponding to rotary speed of said shaft thereby causing temperature of said bearing to increase at a faster rate than if said lubricant were discharged at said optimum rates; and thereafter operating said oil pump so as to discharge said lubricant at reduced rates and eventually at said optimum flow rates, wherein time required for said bearing to reach saturation point thereof from said start-up is significantly reduced.

4. The method of claim 3 wherein said oil pump begins to be operated at said reduced rates after said saturation point is reached.

* * * * *

UNITED STATES PATENT AND TRADEMARK OFFICE
CERTIFICATE OF CORRECTION

PATENT NO. : 6,374,950 B1
DATED : April 23, 2002
INVENTOR(S) : Nakakatsu Takeno

It is certified that error appears in the above-identified patent and that said Letters Patent is hereby corrected as shown below:

<u>Column 3,</u>
Line 42, change "400" to -- 4000 --.

Signed and Sealed this

Twenty-third Day of July, 2002

*Attest:*

*Attesting Officer*

JAMES E. ROGAN
*Director of the United States Patent and Trademark Office*